Feb. 13, 1940.    C. SCHÜRMANN    2,189,930
CLUTCH OR THE LIKE
Filed June 30, 1939
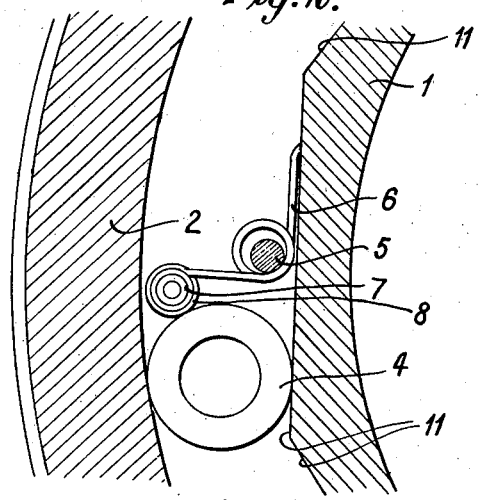
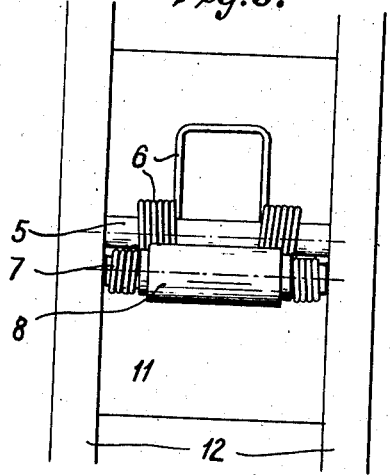
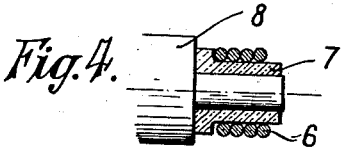
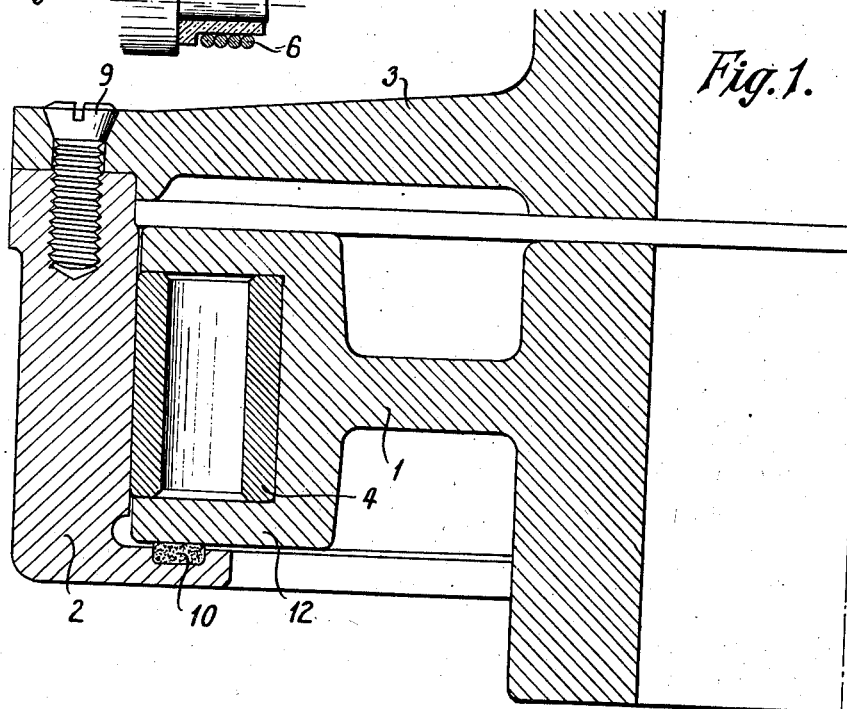
INVENTOR
CARL SCHURMANN
BY
Young, Emery & Thompson
ATTYS.

Patented Feb. 13, 1940

2,189,930

UNITED STATES PATENT OFFICE 2,189,930

CLUTCH OR THE LIKE

Carl Schürmann, Dusseldorf, Germany, assignor to The Aerogen Company Limited, London, England, a British company Application June 30, 1939, Serial No. 282,253
In Germany February 4, 1938

5 Claims. (Cl. 192—44)

This invention relates to a roller clutch for use with advantage as an overrunning clutch or as a device preventing reverse movement of a rotary member and it has for its object to obtain greater reliability of uniform and simultaneous engagement of all clamping rollers and thereby to render the roller clutch useful for the transmission of large torques and for very high rotary speeds.

The unreliable action of roller clutches hitherto in use is attributable to two causes:

(1) The roller housings were always built up of several components for the purpose of easier machining of the clamping faces, such components being apt after a certain running period to become loose and thereby to give rise to undue lateral play of the clamping rollers enabling the latter to assume an oblique position. Immediately a roller assumes an oblique position it becomes wedged in the advance of the driving clutch member and thereby is exposed to the risk of having to transmit the whole of the turning moment by itself. This invariably results in the destruction of either the roller or of the co-operating clamping faces.

(2) In the transition from idle running to the coupling of the driven clutch member proper driving engagement occurs initially only on that side of the shaft on which the clamping rollers have been brought into engagement with the clamping faces by their own weight. The rollers on the opposite side of the shaft remain ineffective so that the load is unequally distributed.

This defect has already been recognised in part and in order to avoid it springs were used to press the rollers into engagement but the known spring arrangements were not satisfactory in that upon a change of the rotary direction the rollers were not brought into engagement sufficiently quickly and thus were not prevented from assuming oblique positions. Moreover the springs were apt to damage the roller surfaces within a relatively short time.

In order to obviate these defects, i. e. to avoid a loosening of the clamping rollers and attain a reliable simultaneous engagement thereof between the driving and driven members without risk of obliquity or damage of the roller surfaces, according to this invention the clamping rollers confined between the lateral guide walls in the groove between the driving and the driven members are each controlled by a lever-like spring fulcrumed between the lateral guide members. The lateral members confining the groove accommodating the clamping rollers between the driving and driven members are made integral with the member containing the groove. These and other features of the invention will be more clearly understood by reference to the accompanying drawing in which a roller clutch according to this invention is illustrated by way of example.

Figure 1 is a fragmental section through the clutch taken parallel to the shaft.

Figure 2 shows a fragmental section through the clutch taken at right angles to the shaft.

Figure 3 is a corresponding view of the periphery of the inner clutch element and Figure 4 shows a detail on an enlarged scale.

As shown the clutch consists of an inner element 1 provided on its periphery with a groove confined between two lateral members 12. The outer clutch element, here the driven element, is in the form of a cylindrical ring 2 which is secured by means of bolts 9 to the element 3. Displaceable in the groove in the driving member 1 are the clamping rollers 4, which by means of springs 6 are urged into engagement with the two clutch elements. The springs 6 are in the form of double-armed twin levers fulcrumed on pins 5 extending transversely across the groove. The twin ends of the lever arms of the springs 6 engaging the rollers 4 carry pressure rollers 8 forming the actual contact surfaces through which the spring pressures are exerted upon the rollers 4 over substantially their whole length. A ring packing 10 inserted between the inner and outer clutch elements 1 and 2 is preferably provided to prevent the ingress of foreign matter to the operative surfaces.

The inner clutch element 1 provided with individual clamping faces 11 is made in one with the lateral guide faces 12. In order to enable this to be done the individual clamping faces 11 are not spiral shaped but are constituted by straight or cylindrical faces enabling them to be readily machined from one solid piece. The pressure springs 6 as clearly shown in Figures 2 to 4 are double-armed twin levers and moreover so constructed that both spring ends (with or without bearing sleeves 7) form a joint carrier for a pressure roller 8 thereby enabling the spring pressure to be transmitted to the clamping roller 4 solely by the pressure roller 8. The spring pressure thus transmitted to the pressure roller is a multiple of the weight of the clamping rollers 4 with the result that the latter are forced in every position and even at high rotary speeds into reliable engagement with the clutch elements and upon a change of direction (on the transition from idle running to clutching) the clutch operates at once and free from all play. By the twin construction of the springs an oblique position of the clamping rollers is at the same time definitely prevented.

In order that the spring 6 may fulfil its function even at high rotary speeds for example of 2000 to 6000 revolutions per minute the pressure roller 8 is journalled at a short distance from the face of the outer clutch element; moreover the windings of the spring surrounding the pin 5 have an internal diameter greater than the diameter of the pin. As the centrifugal force increases the pressure roller 8 is therefore able to approach the ring 2 until it comes into contact therewith. At the same time the spring 6 urges the pressure roller 8 against the clamping roller 4 without its pressure being in any way impaired by the action of the centrifugal force. The arrangement of the pressure roller 8 at a short distance from the face of the outer clutch element has moreover the advantage that the clamping roller 4 during idle running is forced away from the outer clutch element namely into the angle between the pressure roller and the adjacent clamping face.

As will be observed from Figure 2 the pin 5 on which the spring 6 pivots is disposed centrally of the associated clamping face 11. The purpose of this arrangement is to enable the clamping roller 4 to be transferred to the other end of the clamping face 11 and to reverse the spring 6 on its pin 5 so that the clutch will then operate in the opposite direction of rotation.

The effect of this clutch would be the same if the cylindrical surface was formed on the inner clutch element and the individual clamping faces on the outer one.

I claim:

1. A roller clutch for driving and driven members, comprising lateral guide members on one of said driving and driven members, clamping rollers confined between the driving and driven members in a groove between the lateral guide members, and a lever-like spring for each roller fulcrumed between the lateral guide members and controlling the rollers, each spring being in the form of a frame hinged to form a double-armed twin lever.

2. A roller clutch for driving and driven members, comprising lateral guide members on one of said driving and driven members, clamping rollers confined between the driving and driven members in a groove between the lateral guide members, and a lever-like spring for each roller fulcrumed between the lateral guide members and controlling the rollers, each spring being in the form of a frame having a roller whereby the pressure is transmitted to the clamping roller uniformly over substantially its entire length by the spring roller.

3. A roller clutch for driving and driven members, comprising lateral guide members on one of said driving and driven members, clamping rollers confined between the driving and driven members in a groove between the lateral guide members, and a lever-like spring for each roller fulcrumed between the lateral guide members and controlling the rollers, each spring being in the form of a frame carrying a pressure roller located close to the face of the other of said driving and driven members.

4. A roller clutch for driving and driven members, comprising lateral guide members on one of said driving and driven members, clamping rollers confined between the driving and driven members in a groove between the lateral guide members, a lever-like spring for each roller fulcrumed between the lateral guide members and controlling the rollers, a pressure roller bearing sleeve carried by each spring, and a pressure roller on each sleeve.

5. A roller clutch for driving and driven members, comprising lateral guide members on one of said driving and driven members, clamping rollers confined between the driving and driven members in a groove between the lateral guide members, a lever-like spring for each roller fulcrumed between the lateral guide members and controlling the rollers, and a pin for each spring constituting a fulcrum for each spring lever and located centrally of a clamping face of the one of said driving and driven members carrying said guide members.

CARL SCHÜRMANN.